United States Patent [19]

Mennino, Jr. et al.

[11] 4,275,272
[45] Jun. 23, 1981

[54] REMOTE TIME AND CHARGE SYSTEM

[75] Inventors: Michael F. Mennino, Jr., Glendale, Ariz.; Donald J. Coppin, Elmhurst, Ill.

[73] Assignee: GTE Automatic Electric Laboratories Incorporated, Northlake, Ill.

[21] Appl. No.: 92,409

[22] Filed: Nov. 5, 1979

[51] Int. Cl.³ .......................................... H04M 15/12
[52] U.S. Cl. ............................ 179/7.1 TP; 179/7.1 R
[58] Field of Search .............. 179/7.1 TP, 7.1 R, 7 R, 179/18 AD, 2 A, 2 AM

[56] References Cited

U.S. PATENT DOCUMENTS

| 3,920,911 | 11/1975 | Lukas | 179/7.1 TP |
| 3,920,912 | 11/1975 | Anderson et al. | 179/7.1 TP |
| 4,072,825 | 2/1978 | McLay et al. | 179/7.1 TP |
| 4,090,034 | 5/1978 | Moylan | 179/7.1 R |

Primary Examiner—Gerald L. Brigance
Attorney, Agent, or Firm—Robert J. Black; Frank J. Bogacz

[57] ABSTRACT

A remote time and charge system for use in conjunction with a telephone traffic service position system is shown. This system provides each hotel or motel with an automated print out of the duration of a particular call, the identity of the particular caller within the hotel or motel and the charges to be applied to the particular call. As a result, no attendant is required at each hotel or motel to monitor long distance calls and request time and charge information for each of them.

9 Claims, 1 Drawing Figure

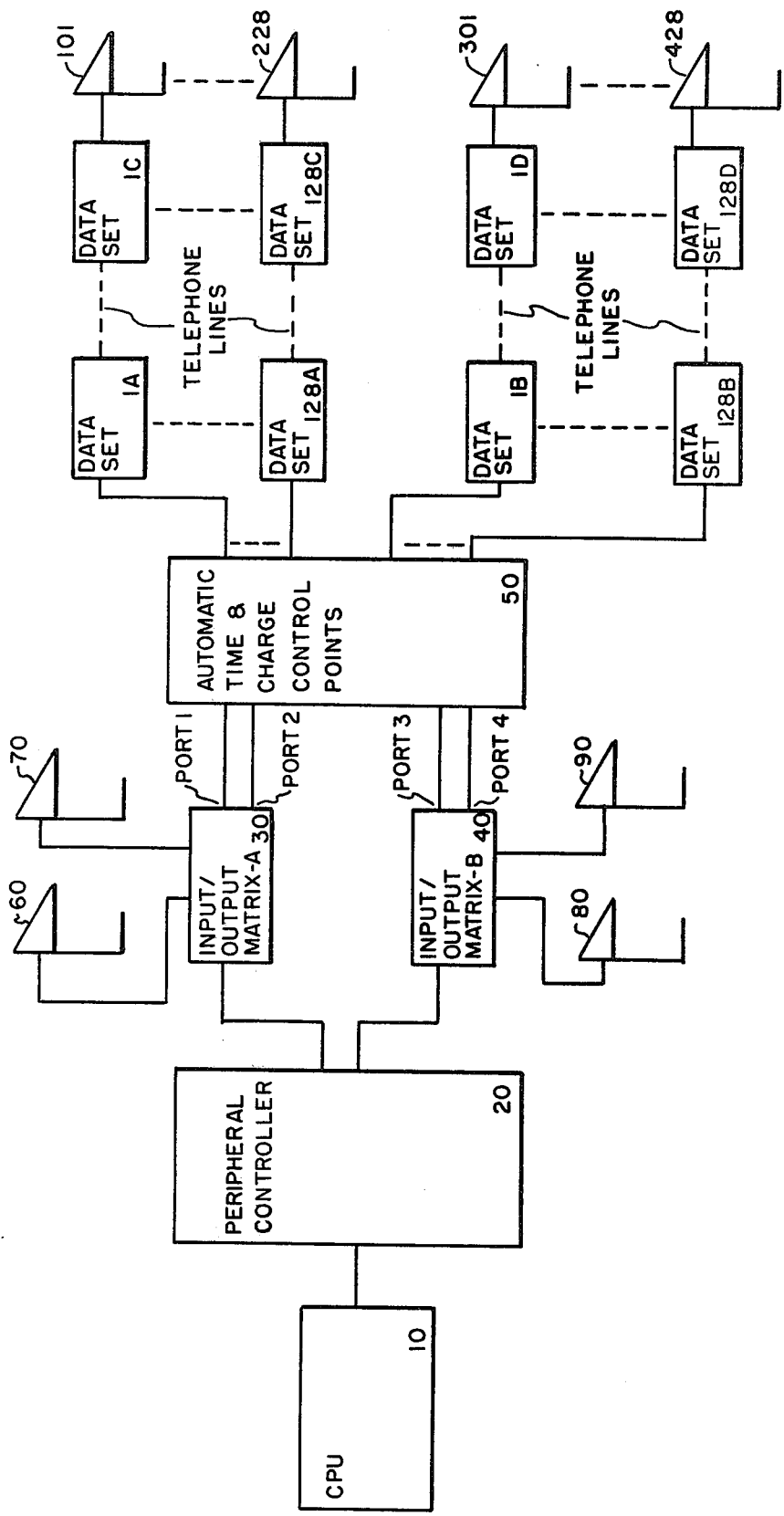

REMOTE TIME AND CHARGE SYSTEM

BACKGROUND OF THE INVENTION (1) Field of the Invention

The present invention pertains to the automated generation of billing information for long distance telephone calls and more particularly to a system for the transmission of time and charge information from a telephone central office to each of a number of private branch exchanges.

(2) Description of the Prior Art

With the advent of electronic telephone switching systems, many of the routinely performed manual tasks of operators were automated. One such telephone system is the Traffic Service Position System (TSPS) manufactured by GTE Automatic Electric Company. The TSPS system allows large concentrations of toll telephone circuits at the most convenient location and it permits the operators who service these circuits to be located many miles away.

Historically, when a hotel or motel guest desired to make a toll telephone call, the guest would ring the hotel operator and request long distance. The hotel operator would ring the long distance operator and request time and charge information at the completion of the call. The long distance operator would then complete the guest's call. The hotel operator would monitor the guest's call and at the completion would again ring the toll operator to receive the time and charge information pertaining to the call. The hotel operator would then calculate the appropriate call and add this amount to the guest's bill.

This system dictated that the hotel operator monitor several telephone calls and hand write billing tickets for each completed call. This situation required that the hotel or motel operator take considerable time away from her other duties and be concerned with the billing of long distance telephone calls. Therefore, in an effort to minimize the amount of time required by the hotel operator and automate the billing function, the present remote time and charge system was developed for addition to the TSPS system. The TSPS system facilitated this development since it already possessed the ability to automatically calculate time and charge information. The remote time and charge system provides for the transmission of time and charge information from a TSPS switching center to a data terminal located at the particular hotel or motel which made the call. In order to prevent the loss of such information, duplicate copies of each time and charge record are recorded at the TSPS switching center.

U.S. Pat. No. 4,022,977 issued on May 10, 1977 to J. Nomura teaches an automatic meter reading system whereby a measurement is made of a resistance value representing a digit shown on a meter.

U.S. Pat. No. 3,819,862 issued on June 25, 1974 to W. P. Hedges teaches a centralized system for indicating the condition of hotel or motel rooms. This system is embodied via a portable unit carried by hotel personnel from room to room.

Therefore, it is the objective of the present invention to provide an automated system whereby digital information representing time and charge information of toll calls originated by hotel or motel guests is automatically transmitted to each hotel or motel at the completion of the call.

It is also a feature of the present invention to provide duplicated recording of such information to prevent loss of billing revenue.

It is of further feature of the present invention to provide the remote billing function within a presently existing electronic telephone switching center.

SUMMARY OF THE INVENTION

The present invention comprises a remote time and charge system for use in conjunction with an electronic telephone traffic service position system. The electronic traffic service position system includes a central processing unit and a peripheral controller connected to the central processing unit via a bus structure.

The peripheral controller includes a bus connection to a switching apparatus. The switching arrangement has a plurality of input and output ports. A data receiving and display device is connected to a particular one of the output ports of the switching apparatus. An array of data transmission devices is also included, each data transmission device is connected to a particular output port of the switching apparatus. Each of the data transmission devices is connected via a transmission line facility to one of a group of remotely located data terminals.

When a motel guest dials a long distance number, a connection is established through the motel's private branch exchange to a traffic service position system. After the long distance call has been terminated, the traffic service position system will calculate the time and associated charge of the particular call. The central processing unit of the TSPS system selects the particular remote data terminal which is to receive the time and charge information. This is accomplished via an examination of the calling party's identity and accessing a data base to determine which remote data terminal is associated with the particular calling party's identity. The data to be transmitted is then formated.

The central processing unit communicates with the peripheral controller to establish a switching path through the switching apparatus to a particular data transmission device and simultaneously to a local data receiving device. A data transmission line connects the data transmission device to a remotely located data receiving device at the calling party's motel. The central processing unit then transmits the time and charge message to the remotely located data terminal and the local data receiving device. Simultaneously, the time and charge information is printed at the calling party's motel data terminal and also at the local data terminal located at the TSPS office. The time and charge message is printed at the local data terminal at the TSPS office so that in the event that a malfunction occurs in the transmission of the data to the motel, an operator at the TSPS office may telephone the required information directly to the motel.

The switching apparatus may connect up to 256 of such remote data terminals to a TSPS office. Each message containing time and charge information, which is transmitted to a motel, is given a sequence number so that the hotel operator can tell by a cursory examination whether any numbers in the sequence are missing and therefore whether any time and charge messages were lost.

The TSPS office also provides for the periodic transmission of test messages to each of the remotely located terminals to insure that each remotely located data terminal and its associated transmission equipment is operational.

DESCRIPTION OF THE DRAWING

The single sheet of drawing included herewith is a block diagram of a remote time and charge system embodying the principles of operation of the present invention.

DESCRIPTION OF THE PREFERRED EMBODIMENT

Referring to the drawn FIGURE, a remote time and charge system is shown. This system includes a central processing unit CPU 10 connected via a bus arrangement to a peripheral controller 20. Input/Output matrix-A 30 and Input/Output matrix-B 40 are each connected to peripheral controller 20. An automatic time and charge control point array 50 is connected to each Input/Output matrix 30 and 40. Input/Output matrix-A 30 is connected to the automatic time and charge control point array via ports one and two and Input/Output matrix-B 40 is connected to the control point array 50 via ports three and four.

Ports one through four are connected through the control point array 50 to data sets 1A through 128A and to data sets 1B through 128B. Each data set of the group 1A through 128A is connected to a corresponding remotely located data set 1C through 128C. This connection is established via telephone line facilities between each pair of data sets (for example, data sets 1A and 1C are connected via a telephone line, similarly 2A and 2C are connected, etc.). Similarly, each of data sets 1B through 128B is connected via a telephone line facility to another group of data sets remotely located 1D through 128D. Each of data sets 1C through 128C and 1D through 128D is respectively connected to a data terminal device 101 through 228 and 301 through 428.

Input/Output matrix-A 30 is connected to two data terminal devices 60 and 70. Input/Output matrix-B 40 is connected to two data terminal devices 80 and 90.

Central processing unit 10 includes a traffic service position system central processing unit as taught in U.S. Pat. No. 3,818,455, entitled "Control Complex for TSPS Telephone System" issued to E. F. Brenski et al, with the same assignee as the present invention. Peripheral controller unit 20 is taught by U.S. Pat. No. 3,906,163, issued on Sept. 16, 1975 to E. F. Brenski et al, entitled "Peripheral Control Unit for a Communication Switching System" to the same assignee as the present application. Each data terminal device 60, 70, 80, 90, 101 through 128, and 301 through 428 may comprise a model 33 RO teletypewriter manufactured by the Teletype Corporation. Each of the data sets 1A through 128A, 1B through 128B, 1C through 128C and 1D through 128D may comprise a model 25C data set as manufactured by the GTE Lenkurt Incorporated.

Input/Output matrix-A 30 and matrix-B 40 are switching devices for connecting the peripheral controller 20 to its associated peripheral devices. These matrices 30 and 40 are shown in the U.S. Pat. No. 3,818,455. The automatic time and charge control points 50 are of the kind taught in U.S. Pat. No. 3,818,455. The control points are organized into 8-bit words. One word is required for the control functions of each data set of the 256 that may be implemented.

Input/Output matrix-A 30 is connected to the automatic time and charge control points 50 via ports 1 and 2 and matrix-B 40 is connected to control points 50 via ports 3 and 4. Peripheral controller 20 operates up to four data sets. Simultaneously peripheral controller 20 also transmits the same information to data terminals 60 or 70 via matrix-A 30 and to data terminal 80 or 90 via matrix-B 40. For example, the time and charge message transmitted via data set 1A connected to port 1 is also simultaneously transmitted to data terminal 60. Concurrently, data set 2A may be transmitting another time and charge message with the output of this message also appearing on data terminal 70. Similar operation occurs for Input/Output matrix-B 40, data sets 1B through 128B and data terminals 80 and 90. In addition, matrix-A 30 may operate data terminals 1B through 128B and matrix-B 40 may operate data terminals 1A through 128A.

When a long distance call is placed by a hotel or motel guest, central processing unit 10 completes the call in a normal fashion. At the completion of the call, central processing unit 10 calculates the time and charge associated with the particular call and gathers all the pertinent data. This data is then formated into a time and charge message as shown below in the table. Central processing unit 10 determines which particular data set is to be used to transmit the message to the hotel or motel from which the guest telephoned. Next, central processing unit 10 instructs peripheral controller 20 to establish connection through Input/Output matrix-A 30, for example, via port 1 through the appropriate word of control points of array 50 to data set 1A and simultaneously to establish connection through Input/Output matrix-A 30 to data terminal 60. Then central processing unit 10 transmits the time and charge message via peripheral controller 20 to Input/Output matrix-A 30 whereby the message is printed on data terminal 60 and also transmitted via data set 1A over the appropriate telephone line to data set 1C where it is printed on data terminal 101 at the hotel or motel from which the call was placed.

Simultaneously with the above, peripheral controller 20 may also be transmitting through Input/Output matrix-A 30 via port 2 to data set 128A, to data set 128C, to data terminal 228 and at the same time printing on data terminal 70 locally. Similarly peripheral controller 20 may simultaneously operate two data sets of the group 1B through 128B and data terminals 80 and 90 respectively. That is, simultaneously four data sets two may be operated along with data terminals 60, 70 and 80, 90. Up to 4 time and charge messages may thereby be sent to 4 different hotel or motels at one time.

Each message which is transmitted to a remotely located data terminal 101 through 228 or 301 through 428, is also printed locally at the TSPS office on one of the four data terminals 60-90. This is done so that should the transmission to the remotely located data terminal fail for any reason, a copy is retained within the TSPS office. An operator at the TSPS office may then telephone the information directly to the hotel or motel for billing purposes.

Central processing unit 10 periodically transmits messages to each of the remotely located data terminals 101-228 and 301-428. This is done in order to verify the operation of each remotely located data terminal.

In addition, each message to a particular hotel or motel is given a sequence number, so that the hotel or motel operator may tell by a cursory examination whether any time and charge messages have been lost. This is done by examining the sequence numbers appended to each message and verifing that each number in the sequence is accounted for.

TABLE

TIME AND CHARGE MESSAGE FORMAT

A BB C D EEE-EEE-EEEE FFFFFFFFFF GGG-GGG-GGGG HHH.HH III JJ KK LL:LL

A—blank or asterisk. Asterisk indicates problem in sending to remote user.
B—Sequence number
C—blank or asterisk. Asterisk indicates hotel.
D—TSPS traffic office number
E—Calling Number
F—Special Number, e.g. Credit Card Number or Hotel Room Number
G—Called Number
H—Charge for the call
I—Duration of call, in minutes.
J—Class of charge
K—Day of Month
L—Answer Time Although a preferred embodiment of the invention has been illustrated, and that form described in detail, it will be ready apparent to those skilled in the art that various modifications may be made therein without departing from the spirit of the invention or from the scope of the appended claims.

What is claimed is:

1. A remote time and charge system for use in conjunction with a telephone traffice service position system, said traffic service position system including a central processing unit and a peripheral controller connected to said central processing unit and operated to transmit data from said central processing unit to peripheral devices, said remote time and charge system comprising:
    switching means connected to said peripheral controller via input ports and operated in response to signals transmitted from said peripheral controller to establish a connection from one of said plurality of input ports to one of a plurality of output ports for the transmission of data;
    data receiving means connected to a particular one of said output ports of said switching means and operated in response to said connection of a particular one of said input ports through said switching means via a particular one of said output ports to said data receiving means to receive data transmitted from said central processing unit;
    a plurality of data transmission means, each connected to a particular output port of said switching means and operated in response to connection of said switching means to transmit data to a particular remote location;
    a first plurality of data terminals, each connected to a corresponding one of said plurality of data transmission means whereby data is transmitted from said central processing unit to each of said first plurality of data terminals and simultaneously data is transmitted from said central processing unit to said data receiving means, said transmitted data representing time and charge information relative to particular telephone calls placed at each of said remote locations.

2. A remote time and charge system as claimed in claim 1, wherein: said data receiving means includes at least one data terminal.

3. A remote time and charge system as claimed in claim 1, wherein: said data receiving means includes a second plurality of data terminals.

4. A remote time and charge system as claimed in claim 1, 2 or 3 wherein: each of said data terminals includes a device for displaying readable characters in hard copy.

5. A remote time and charge system as claimed in claim 1, wherein said data transmission means includes:
    a first plurality of data sets, each connected to a particular one of said output ports of said switching means and each operated to transmit messages to said remote locations;
    a second plurality of data sets, each connected between a corresponding one of said first plurality of data sets and a corresponding one of said first plurality of data terminals, and each operated to receive said transmitted data;
    a plurality of transmission lines each of said plurality connected between one of said plurality of said first data sets and one of said plurality of said second data sets.

6. A remote time and charge system as claimed in claim 1, wherein: said switching means is simultaneously connected to said data receiving means and to a particular one of said first plurality of data terminals whereby data is transmitted simultaneously from said central processing unit to said data receiving means and to said particular one of said first plurality of data terminals.

7. A remote time and charge system as claimed in claim 1, wherein: said first plurality of data terminals consists of a number of data terminals in the range of from 1 to 256.

8. A remote time and charge system as claimed in claim 1, wherein said switching means includes:
    an array of latches for controlling the operation of each of said plurality of data transmission means;
    a first switching matrix connected between said array of latches and said peripheral controller;
    a second switching matrix connected between said array of latches and said peripheral controller.

9. A remote time and charge system as claimed in claim 8, wherein: each of said switching matrices include output connections to at least two data terminals.

* * * * *